(12) United States Patent
Supikov et al.

(10) Patent No.: US 11,733,648 B2
(45) Date of Patent: Aug. 22, 2023

(54) DEEP COMPUTATIONAL HOLOGRAPHY

(71) Applicant: Intel Corporation, Santa Clara, CA (US)

(72) Inventors: Alexey Supikov, Santa Clara, CA (US); Qiong Huang, San Jose, CA (US); Anders Grunnet-Jepsen, San Jose, CA (US); Paul Winer, Aptos, CA (US); Ronald T. Azuma, San Jose, CA (US); Ofir Mulla, Petach Tikva (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/872,669

(22) Filed: Jul. 25, 2022

(65) Prior Publication Data
US 2022/0357704 A1 Nov. 10, 2022

Related U.S. Application Data

(63) Continuation of application No. 16/451,518, filed on Jun. 25, 2019, now Pat. No. 11,435,695.

(51) Int. Cl.
*G03H 1/08* (2006.01)
*G03H 1/26* (2006.01)
(Continued)

(52) U.S. Cl.
CPC ......... *G03H 1/0808* (2013.01); *G03H 1/2645* (2013.01); *G06F 18/214* (2023.01); *G06N 3/08* (2013.01); *G06V 10/454* (2022.01); *G06V 10/60* (2022.01); *G06V 10/764* (2022.01); *G06V 10/82* (2022.01); *G03H 2001/266* (2013.01); *G03H 2210/441* (2013.01); *G03H 2210/46* (2013.01)

(58) Field of Classification Search
CPC ...... G03H 1/08; G03H 1/0866; G03H 1/0891; G03H 1/26; G03H 1/2645; G03H 1/0808; G03H 2240/11; G03H 2240/12; G03H 2001/0088; G03H 2001/266; G03H 2001/0816; G03H 2227/02; G03H 2210/441; G03H 2210/46; G03H 1/0402; G03H 1/0486; G03H 2001/0428; G06N 3/08; G06N 3/04; G06N 3/02; G06N 3/084; G06N 9/62; G06N 9/6256; G06N 3/067; G06T 7/0002; G06T 1/20; G06T 9/002; G06T 19/006; G06K 9/62; G06K 9/6256; G06F 18/214; G06V 10/44; G06V 10/60
USPC .......................................................... 359/9
See application file for complete search history.

(56) References Cited

U.S. PATENT DOCUMENTS

2019/0294108 A1 9/2019 Ozcan et al.

OTHER PUBLICATIONS

Notice of Allowance for U.S. Appl. No. 16/451,518, dated May 16, 2022.
(Continued)

*Primary Examiner* — Stephone B Allen
*Assistant Examiner* — Jyotsna V Dabbi
(74) *Attorney, Agent, or Firm* — Essential Patents Group, LLP

(57) ABSTRACT

Techniques related to generating holographic images are discussed. Such techniques include application of a hybrid system including a pre-trained deep neural network and a subsequent iterative process using a suitable propagation model to generate diffraction pattern image data for a target holographic image such that the diffraction pattern image data is to generate a holographic image when implemented via a holographic display.

20 Claims, 8 Drawing Sheets

(51) Int. Cl.
*G06V 10/764* (2022.01)
*G06V 10/82* (2022.01)
*G06N 3/08* (2023.01)
*G06F 18/214* (2023.01)
*G06V 10/44* (2022.01)
*G06V 10/60* (2022.01)

(56) References Cited

OTHER PUBLICATIONS

Barbastathis, et al., "On the use of deep learning for computational imaging", Review Article, Optica, vol. 6, No. 8, pp. 921-943, Jul. 25, 2019.

Horisaki, et al., "Deep Learning-generated holography", Applied Optics, vol. 57, No. 14, pp. 3859-3863, May 10, 2018.

Peng, et al., "Neural holography with Camera-in-the-loop Training", ACM Trans. Graph., vol. 29, No. 6, Artivle 185, pp. 1-14, Dec. 2020.

Rivenson, et al., "Deep Learning in Holography and Coherent Imaging", Nature, Light: Science and Applications, pp. 1-8, Aug. 19, 2019.

Yamauchi, et al., "Optimization of computer-generated holograms by an artificial neural network", 2nd International Conference on Knowledge Based Intelligent Electronic Systems, IEEE, pp. 220-223, Apr. 21, 1998.

DEEP COMPUTATIONAL HOLOGRAPHY

CLAIM OF PRIORITY

This Application is a Continuation of U.S. patent application Ser. No. 16/451,518, filed on 25 Jun. 2019 and titled "DEEP COMPUTATIONAL HOLOGRAPHY", which is incorporated by reference in its entirety for all purposes.

BACKGROUND

Holographic display devices may present holographic images in a variety of applications including automotive heads up displays (HUDs), augmented reality (AR) displays, virtual reality (VR) displays, and others. Such holographic display devices have advantages over other displays including an inherent ability to focus light at different distances, very high light efficiency, and small size, to name a few. In the context of presenting holographic images, a spatial light modulator (SLM) is a key component. An SLM has many small pixels that are capable of modulating either the phase of light or its amplitude, but not both. Although devices that combine both phase and amplitude modulation are possible, technical constraints make such devices large, costly, and extremely complex. Therefore, SLMs that modulate only one of phase or amplitude are typically used with phase modulation being employed more frequently.

In the context of phase or amplitude modulation SLMs, given a particular holographic image that is to be displayed, the corresponding pattern, a holographic diffraction image, to be displayed on the SLM must be determined. In image generation, the holographic diffraction image displayed on the SLM in combination with highly coherent light emitted onto the SLM generates the holographic image viewed by a user. Typically, the holographic diffraction image is generated based on a constrained optimization problem that is, in turn, based on the display being implemented and the configuration of the imaging set up of the display as well as the particular holographic image to be displayed. For example, the constrained optimization problem may model forward propagation of light for the display set up. The constrained optimization problem is typically solved using iterative approaches that require tens or hundreds of iterations with each iteration being computationally expensive. For example, one iteration may include multiple passes across an entire image including application of a non-linear function, inverse fast Fourier transform (IFFT), non-linear function, fast Fourier transform (FFT), etc. with each being performed on a complex image (i.e., an image having two floating point values: one each for amplitude and phase).

Current techniques for generating holographic diffraction images are computationally expensive and have other limitations. It is with respect to these and other considerations that the present improvements have been needed. Such improvements may become critical as the desire to present holographic images in a variety of contexts becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
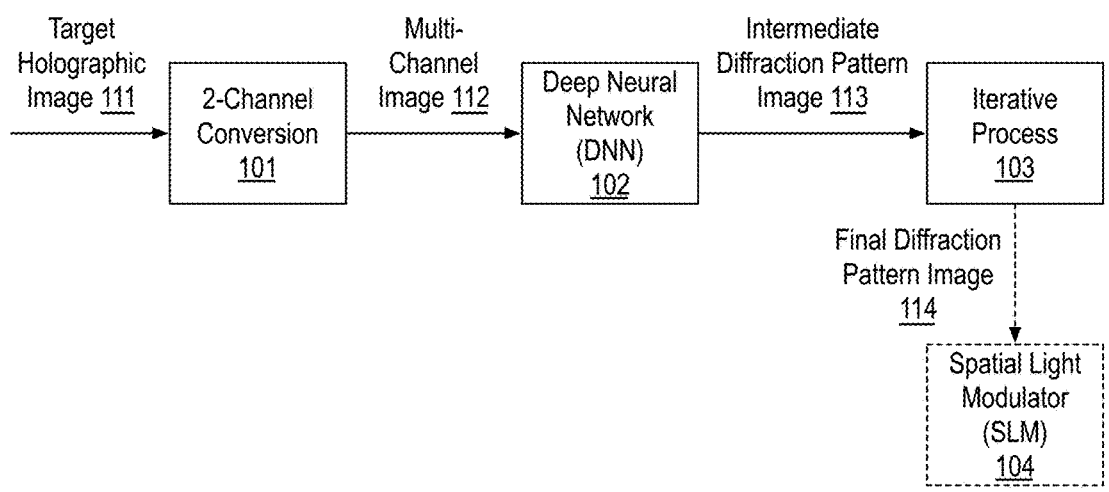
FIG. 1 illustrates an example system for generating diffraction pattern image data based on a given holographic imaging arrangement and target holographic image data.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein. The terms "substantially," "close," "approximately," "near," and "about," generally refer to being within +/−10% of a target value. The term "satisfies" when used in reference to a threshold indicates the value in question meets the condition established by the threshold. The terms "compares favorably" when used in reference to a threshold indicates the value in question is greater than or greater than or equal to the threshold. Similarly, the terms "compares unfavorably" when used in reference to a threshold indicates the value in question is less than or less than or equal to the threshold.

Methods, devices, apparatuses, computing platforms, and articles are described herein related to holographic imaging and, in particular, to generating diffraction pattern image data corresponding to a given holographic imaging arrangement and target holographic image using a pre-trained deep neural network followed by an iterative process based on a suitable propagation model.

In various contexts, a holographic imaging arrangement may be employed to display holographic images to a user. The holographic imaging arrangement may include a light source, a spatial light modulator (SLM), various optical elements, and the spatial arrangement of such components. As used herein, the term holographic imaging arrangement indicates an arrangement of any components for the display of a holographic image to a user. The term holographic image indicates any hologram that is displayed to a user including 2D or planar holograms, 3D holograms, or holograms projected onto a screen. Notably, such holographic images can be seen with the naked eye and are generated using interference patterns generated by diffraction of light. Furthermore, a target holographic image is provided for eventual display to the user using the holographic imaging arrangement. The target holographic image, as the name suggests, is the image that is to be shown to the user via the holographic imaging arrangement.

As discussed, to generate a holographic image that closely matches the target holographic image, a SLM displays a diffraction pattern image and coherent light is emitted onto the SLM, which modifies and reflects or transmits the light toward a viewing space based on diffraction pattern image data provided to the SLM. As used herein, the term diffraction pattern image indicates an image displayed on an SLM or other holographic display device while the term diffraction pattern image data indicates the data, in any format, used to generate the diffraction pattern image. At a particular distance from the SLM (which may include optics between the SLM and the viewing space), the resultant wavefront generates a holographic image. As discussed, the holographic image in some contexts may be projected onto a screen. The holographic image may be planar or it may have depth to provide a 3D hologram. As used herein, the term holographic image indicates a planar or 3D holographic image or hologram. For example, the resultant light field from the SLM may focus to an individual plane or to multiple adjacent planes to generate 3D imagery. Furthermore, time multiplexing techniques may be used to generate the effect of 3D imagery by refreshing planar or 3D holographic images at a rate faster than what is noticeable to the human eye.

The techniques discussed herein accelerate generation of the diffraction pattern image data using deep learning approaches. Notably, the diffraction pattern image corresponding to a target holographic image has little visual correspondence to the target holographic image as discussed further herein with respect to FIGS. 8, 9A, 9B, and 9C. Notably, the task addressed herein is generating diffraction pattern image data for a target holographic image or target holographic image data and a given holographic imaging arrangement. Such diffraction pattern image data may be characterized as holographic diffraction pattern image data, holographic pattern data, holographic pattern image data, etc. In some embodiments, a pre-trained deep neural network is applied to multi-channel image data corresponding to the discussed target holographic image data to generate intermediate diffraction pattern image data. An iterative process using a correspondent propagation model is then applied to the intermediate diffraction pattern image data to determine final diffraction pattern image data for transmission to an SLM or other holographic display device and eventual display of a hologram to a user. As used herein, the term propagation model includes any formula or algorithm that models propagation of light from an SLM to a zone of interest (e.g., a projection plane, a viewing zone, etc.). For example, a propagation model may approximate a diffraction integral for a given holographic setup. Any propagation model may be applied—Fraunhofer propagation (FFT, used for far distances), Fresnel propagation (multiply SLM optical field by quadratic phase profile, apply FFT—used for any distance), etc.

Such techniques advantageously reduce the number of iterations of the propagation model needed to determine the final diffraction pattern image data for improved performance Notably, the final diffraction pattern image data meet an error threshold as defined by a particular error function while the intermediate diffraction pattern image data may not. Furthermore, such techniques provide improved subjective image performance at the same or similar objective image errors as compared to use of only iterative propagation/inverse propagation processing as discussed further herein with respect to FIGS. 9A, 9B, and 9C.

Furthermore, the pre-trained deep neural network is trained by applying the propagation model to the outputs of the network and using the propagation model and corresponding error function as the loss model or function for training the deep neural network. Notably, such approaches are in contrast to generating ground truth diffraction pattern image data (e.g., by iteratively applying the correspondent propagation model to a training set of holographic image data to generate the ground truth data) for training the network. Such approaches advantageously provide flexibility and allow the network to learn intermediate diffraction pattern image data for use by the iterative process and not to simply replicate performance of the iterative process used to compute the ground truth data. Thereby, improved holographic imaging and computational performance are achieved. For example, resultant holographic images based on pre-trained deep neural network application followed by iterative process application have improved objective and/or subjective quality relative to resultant holographic images generated using the iterative process alone. Furthermore, application of the deep neural network drastically reduces the number of iterations needed for convergence. For example, about 20-46% of the number of iterations may be needed to meet the same root mean square error.

FIG. 1 illustrates an example system 100 for generating diffraction pattern image data based on a given holographic imaging arrangement and target holographic image data, arranged in accordance with at least some implementations of the present disclosure. As shown in FIG. 1, system 100 includes a 2-channel conversion module 101, a deep neural network (DNN) module 102, and an iterative process module 103. As shown, system 100 may provide final diffraction pattern image data 114, generated based on target holographic image data 111, to a spatial light modulator (SLM) 104 or other holographic display device such that SLM 104 is part of a holographic imaging arrangement used to present a holographic image or hologram to a user.

Figure 2:
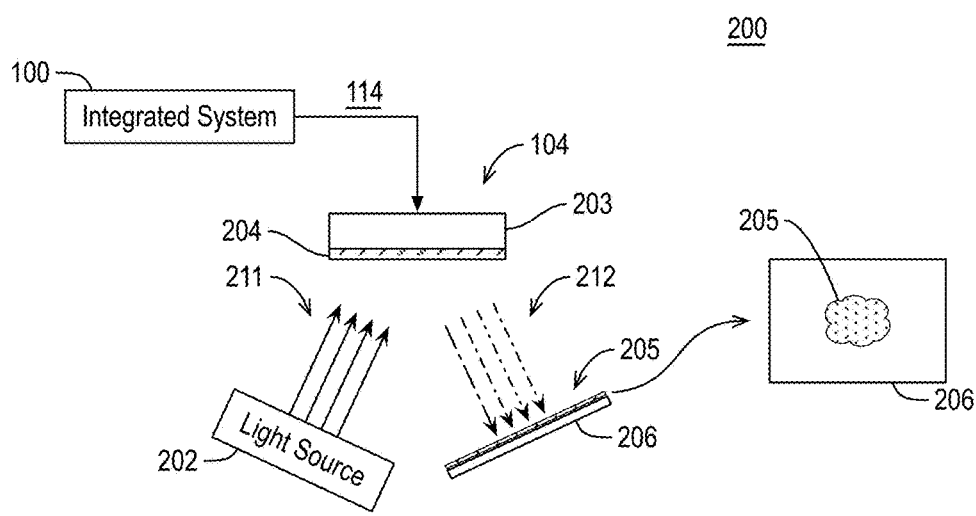
FIG. 2 illustrates an example holographic imaging arrangement.

FIG. 2 illustrates an example holographic imaging arrangement 200, arranged in accordance with at least some implementations of the present disclosure. As shown in FIG. 2, holographic imaging arrangement 200 may include system 100, SLM 104, light source 202, and optional screen 206. System 100 may be implemented in any suitable form factor device such as motor vehicle platform, a virtual reality headset platform, an augmented reality headset platform, a personal computer, a laptop computer, a tablet, a phablet, a smart phone, a digital camera, a gaming console, a wearable device, a display device, an all-in-one device, a two-in-one device, etc. For example, system 100 may generate diffraction pattern image data as discussed herein and system 100 may include components for displaying the corresponding hologram or system 100 may transmit the diffraction pattern image data to another device for display of the hologram. As shown, in some embodiments, system 100 may be integrated into the same housing, onto the same motherboard, into the same system on a chip platform, etc. As used herein, the term integrated system indicates a system integrated into at least the same device package or housing.

As shown, holographic imaging arrangement 200 includes a light source 202 such as a laser light source that emits coherent light 211 onto or toward SLM 104 (optional optics may be provided between a light source 202 and SLM 104). Although illustrated with respect to SLM 104, any suitable holographic imaging device may be employed. SLM 104, based on final diffraction pattern image data 114 generates a corresponding diffraction image within a surface layer 204 thereof, which is on a substrate 203. For example, SLM 104 may include a reflective liquid crystal film that is pixelated (alterable at a pixel level) to provide a modulated image surface representative of final diffraction pattern image data 114. SLM 104 may include any number of pixels and have any size. For example, SLM may have 3, 4, or 6 micron pixels in surface layer 204 and surface layer 204 may be about 12×12 mm to 15×15 mm in surface area, although any pixel size and surface layer 204 area size may be employed.

Furthermore, surface layer 204 modulates, on a pixel-by-pixel basis one of an amplitude or a phase of coherent light 211 to provide modulated light 212. In an embodiment, SLM 104 modulates amplitude (e.g., is capable of modulating amplitude) and is incapable of modulating phase. In another embodiment, SLM 104 modulates phase (e.g., is capable of modulating phase) and is incapable of modulating amplitude. Notably, phase based modulating SLMs are more common, but either may be employed using the techniques discussed herein. Modulated light 212 may be characterized as amplitude modulated light, phase modulated light, coherent pixelated light, etc. Notably, SLM 104 modulates coherent light 211 to provide modulated light 212 that is modulated on a pixel-by-pixel basis. As shown, modulated light 212 propagates through space toward an optional screen 206 and modulated light 212 generates a holographic image 205 that corresponds to final diffraction pattern image data 114 (and, ultimately, target holographic image data 111). Holographic image 205 is generated based on an interference pattern provided by modulated light 212 that is focused at a particular distance from SLM 104. In the context of phase modulation, the limitation of no amplitude modulation means any amplitude variation within holographic image 205 is generated based on constructive and destructive interference as provided by final diffraction pattern image data 114. Although illustrated with respect to a planar holographic image 205, holographic imaging arrangement 200 and the techniques discussed herein may be employed to generate 3D holographic images. Without loss of generality, the disclosed techniques are typically discussed with respect to generating a planar holographic image (e.g., a given distribution of light intensity on a plane at a certain distance from SLM 104) but such techniques are applicable to planar or 3D holographic imaging techniques. In some implementations, distributions of intensities in a volume may be achieved by time multiplexing multiple planar images at different distances to generate a 3D volumetric hologram.

Holographic image 205 seeks to replicate target holographic image data 111 as closely as possible. Holographic image 205 may be any size such as about 5×5 inches without use of intervening optics, depending on the size of the pixels of SLM 104 and the distance of holographic image 205 from SLM 104. Screen 206 may be a standard screen surface reflective to all or most wavelengths of light or screen 206 may be reflective only to a band of light corresponding to the band of light of coherent light 211 and modulated light 212 while being translucent with respect to other bands of light and, in particular, to other bands of visible light. For example, screen 206 may be glass (e.g., a windshield of a car) that has elements that are (largely) invisible to the naked eye but reflect a narrow band of wavelengths around those of coherent light 211 and modulated light 212. In some embodiments, screen 206 includes optical elements that further project and/or reflect modulated light 212 such that, for example, holographic image 205 appears to be over the hood of an automobile.

Holographic imaging arrangement 200 may be employed in any context such as automotive heads up displays (HUDs), augmented reality (AR) displays, virtual reality (VR) displays, multi-focal head mounted displays (HMDs), etc. Such holographic display devices have advantages over other displays including an inherent ability to focus light at different distances, very high light efficiency, small size, etc. Furthermore, final diffraction pattern image data 114 may be transmitted from system 100 to SLM 104 or another component of a holographic display using any suitable technique or techniques. In some embodiments, system 100 is local to SLM 104 such that they are implemented in the same device. In other embodiments, system 100 is remote from SLM 104 and final diffraction pattern image data 114 is transmitted to SLM 104 via wired or wireless communication. In some embodiments, final diffraction pattern image data 114 is stored in a memory accessible to SLM 104.

Returning to FIG. 1, system 100 receives target holographic image data 111. As used herein, the term image generally refers to imagery that may be presented via a display and/or viewed by a user while image data refers to any suitable data structure representative of the imagery and useable by a device to present a corresponding image. Target holographic image data 111 may include any suitable picture, video frame, or the like or any data structure representing a picture or video frame at any suitable resolution. In an embodiment, target holographic image data 111 is single channel image data having a single value (e.g., luma) for pixels thereof such that each value indicates a desired amplitude or brightness for the pixel in a displayed hologram. Target holographic image data 111 may correspond to any desired holographic image or hologram to be presented to a user.

As shown, target holographic image data 111 is received by 2-channel conversion module 101, which converts target holographic image data 111 to multi-channel image data 112 having at least an amplitude component channel and a phase component channel for each pixel or at least some pixels (optional downsampling may be performed) of target holographic image data 111. Notably, target holographic image data 111 may include only amplitude values (e.g., luma values) while holographic propagation models and display devices operate on 2-channel data such that each pixel has an amplitude value and a phase value. The amplitude and phase values may be represented using any suitable technique or techniques. In an embodiment, the amplitude value and a phase value are explicitly provided as pixel-by-pixel values that may have any suitable ranges. In an embodiment, each pixel-by-pixel amplitude value and phase value are represented as a complex number where the real component represents amplitude and the complex component represents phase, as is known in the art.

As discussed, SLM 104 may provide amplitude modulation or phase modulation, but not both. In phase modulation, the amplitude of each pixel of final diffraction pattern image data 114, therefore, is a normalized value such as one while the phase of each pixel may be any value within a particular range. In an embodiment, the phase range is binary, however, any range may be used. Similarly, in amplitude modulation, the phase of each pixel of final diffraction pattern image data 114 is the same value while the amplitude of each pixel may be any value within a particular range.

Multi-channel image data 112 may be generated from target holographic image data 111 using any suitable technique or techniques. In phase modulation examples, the amplitude component channel of multi-channel image data 112 may be copied from the single channel of target holographic image data 111 while values of the phase component channel are generated using any suitable technique or techniques. In an embodiment, converting target holographic image data 111 to multi-channel image data 112 includes setting each amplitude value of the amplitude component channel of multi-channel image data 112 to a corresponding value of target holographic image data 111 and applying a phase pattern to generate phase values of the phase component channel of multi-channel image data 112.

Notably, employing a constant phase value for each pixel of the phase component channel may not provide favorable convergence conditions and therefore a non-constant phase pattern is employed. In some embodiments, applying the phase pattern to generate phase values of the phase component channel of multi-channel image data 112 includes providing randomized phase values (e.g., a randomly generated phase value for each pixel location). In an embodiment, applying the phase pattern to generate phase values of the phase component channel of multi-channel image data 112 includes applying a constant phase mask having particular values having a shape across multi-channel image data 112 such as a centered normal distribution, a shape having one centered normal distribution centered in each quadrant of multi-channel image data 112, or similar distributions. In an embodiment, applying the phase pattern to generate phase values of the phase component channel of multi-channel image data 112 includes determining a phase value pattern that provides expected uniform amplitude distributions based on the propagation model applied by iterative process module 103, which is discussed herein below. Notably, in an embodiment, the phase pattern generation performed by 2-channel conversion module 101 during implementation is the same as that performed by 2-channel conversion module 101 during training, as discussed with respect to FIG. 5.

As shown, multi-channel image data 112 (e.g., a 2-channel image having an amplitude plane and a phase plane) is received by DNN module 102, which generates intermediate diffraction pattern image data 113. In some embodiments, intermediate diffraction pattern image data 113 has the same format as multi-channel image data 112 including the same pixel resolution (e.g., H×W) and the same channels (e.g., an amplitude channel having an amplitude value for each pixel and a phase channel having a phase value for each pixel). Continuing the discussion of phase modulation, in some embodiments, intermediate diffraction pattern image data 113 has an amplitude plane or channel with each amplitude having the same, normalized value (as SLM 104 will not be able to vary amplitude) and a particular phase value for each pixel. However, although such a configuration is required for final diffraction pattern image data 114 when phase modulation is employed, intermediate diffraction pattern image data 113 is not required to have such a data structure.

DNN module 102 may implement any suitable deep learning neural network characterized in that a DNN is an artificial neural network having multiple layers between the input and output thereof with weights trained based on automatic training without human intervention.

Figure 3:
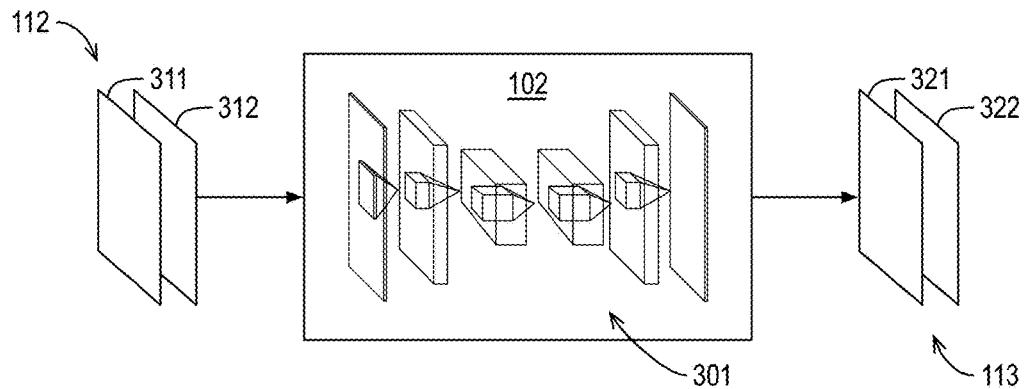
FIG. 3 illustrates exemplary implementation of a deep neural network (DNN) to multi-channel image data to generate intermediate diffraction pattern image data.

FIG. 3 illustrates exemplary implementation of a DNN 301 to multi-channel image data 112 to generate intermediate diffraction pattern image data 113, arranged in accordance with at least some implementations of the present disclosure. As shown in FIG. 3 and as discussed above, multi-channel image data 112 includes multiple channels including an amplitude channel 311 and a phase channel 312 such that amplitude channel 311 includes an amplitude value for each pixel position and phase channel 312 includes a phase value for each pixel position. As discussed, in some embodiments, amplitude channel 311 and phase channel 312 may be represented using a complex value for each pixel location.

DNN module 102 applies pre-trained DNN 301 to multi-channel image data 112 to generate intermediate diffraction pattern image data 113. As shown, intermediate diffraction pattern image data 113 may have the same data structure as multi-channel image data 112 such that intermediate diffraction pattern image data 113 has multiple channels including an amplitude channel 321 and a phase channel 322 with amplitude channel 321 including an amplitude value for each pixel position and phase channel 322 includes a phase value for each pixel position. As with amplitude channel 311 and phase channel 312, in some embodiments, amplitude channel 321 and phase channel 322 may be represented using a complex value for each pixel location. In some embodiments, each amplitude value of amplitude channel 321 has the same normalized value and a particular phase value for each pixel as discussed above. In such embodiments, amplitude channel 321 may not need to be transmitted as its values are already known.

In the context of FIG. 3, DNN 301 is an encoder-decoder convolutional neural network (CNN). However, DNN module 102 may implement a CNN or any other suitable DNN. In some embodiments, DNN module 102 implements a CNN having a number of convolutional layers (with 6 being implemented for illustrative purposes). Each convolutional layer of the CNN receives multi-channel image data 112 or a preceding set of feature maps from a previous layer and each convolutional layer applies a predetermined number of convolution kernels having a predetermined size to the incoming data to generate feature maps or intermediate diffraction pattern image data 113 (e.g., the output corresponding to a final convolutional layer). Each convolutional layer may also optionally be followed by various combinations of rectified linear units (ReLU), max pooling operations, and/or local response normalization (LRN) operations, as is known in the art to generate the discussed feature maps and/or intermediate diffraction pattern image data 113.

Based on the pre-training of the CNN, intermediate diffraction pattern image data 113 is generated as discussed such that intermediate diffraction pattern image data 113 may be used as a starting point for iterative propagation model convergence for improved performance. In some embodiments, the pre-trained DNN is trained using specialized training holographic image data corresponding to a predetermined application of holographic imaging arrangement 200, as is discussed further herein.

Returning to FIG. 1, intermediate diffraction pattern image data 113 is provided to iterative process module 103, which iteratively applies a forward and inverse propagation model to intermediate diffraction pattern image data 113 to generate final diffraction pattern image data. The propagation model may be any suitable propagation model. In some embodiments, applying the propagation model includes applying a fast Fourier transform that models Fraunhofer propagation that assumes that observed image is located sufficiently far from the SLM. In some embodiments, applying the propagation model includes applying a quadratic phase profile and a fast Fourier transform that together model the holographic imaging arrangement correspondent to Fresnel propagation, which provides good approximation for images located at any distance from the SLM. In an embodiment, the iterative process is a Gerchberg-Saxton algorithm that successively applies forward and inverse propagation model applying necessary constraints in between. In an embodiment, the iterative process or algorithm is a Fienup (phase adaptation) algorithm. In an embodiment, the iterative process or algorithm is a FIDOC (Fienup with do not care region) algorithm. As discussed, the number of iterations needed for convergence using intermediate diffraction pattern image data 113 is much less than the number needed for convergence using multi-channel image data 112.

As discussed, the propagation model employed by iterative process module 103 corresponds to the particular arrangement of holographic imaging arrangement 200. For example, both the choice of the propagation model employed and the characteristics of the model itself are based on the particular arrangement of holographic imaging arrangement 200. Characteristics of the particular arrangement of holographic imaging arrangement 200 pertinent to the propagation model choice and the parameters thereof include the optical set up, the distance of the hologram from the holographic display, and other factors.

Final modeled holographic image 114 data are generated based on an iterative algorithm of choice as applied to intermediate diffraction pattern image 113 such that final modeled holographic image data generated using final diffraction pattern image data 114 meets an error threshold based on an applied error function (e.g., a peak signal to noise ratio (PSNR) error function, a minimum absolute error (MAE) function, or a root mean square (RMS) error function). That is, iterative processing is repeated until a result of the propagation model (e.g., the final modeled holographic image data) is within the error threshold of the target of the model (e.g., target holographic image data 111). Notably, the error threshold may not be met with respect to intermediate diffraction pattern image 113. That is, a result of the propagation model (e.g., non-final or intermediate holographic image data based on forward propagation) as applied to intermediate diffraction pattern image 113 may not be within the error threshold of the target of the model (e.g., target holographic image data 111). Such objective error thresholding may only be attained by applying an iterative algorithm to the output of the DNN. Thereby, hybrid system of DNN inference and iterative processing are provided. As discussed, such hybrid processing advantageously decreases the number of (computationally expensive) iterations required and improves subjective image quality in the resultant hologram.

Figure 4:
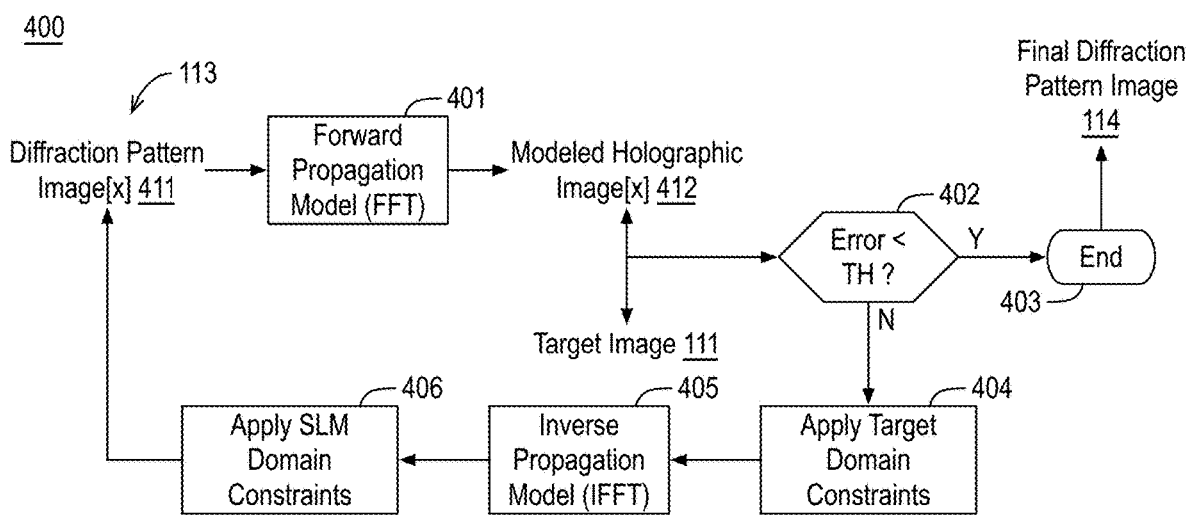
FIG. 4 illustrates exemplary implementation of an iterative hologram computation process to generate final diffraction pattern image data.

FIG. 4 illustrates exemplary implementation of an iterative hologram computation process 400 to generate final diffraction pattern image data 114, arranged in accordance with at least some implementations of the present disclosure. For example, FIG. 4 illustrates an exemplary application of an iterative hologram computation process (e.g., iterative algorithm) using a Fraunhofer propagation model (e.g., FFT for forward propagation and IFFT for inverse propagation). However, any iterative process discussed herein may be implemented. As shown in FIG. 4, iterative process 400 includes application of a forward propagation model 401 (illustrated as a FFT) and an inverse propagation model 405 (illustrated as an IFFT) such that each iteration is performed as follows. Beginning with a particular iteration, x, diffraction pattern image data 411 are generated or, for a first iteration, x=1, received as intermediate diffraction pattern image data 113. That is, intermediate diffraction pattern image data 113 may provide initial diffraction pattern image data 411. In some embodiments, iterative process 400 is, based on only one of phase or amplitude modulation being employed, a constrained optimization problem that may be solved using iteration cycles including, for example, non-linear function, inverse fast Fourier transform (IFFT), non-linear function, fast Fourier transform (FFT), although other higher complexity models may be used. For example, iterative process 400 may implement any propagation model discussed herein.

As shown, a forward propagation of diffraction pattern image data 411 is provided via forward propagation model 401 (which may be characterized as a correspondent propagation model) to generate modeled holographic image data 412 for the current iteration. In some embodiments, modeled holographic image 412 has an amplitude channel and a phase channel as discussed herein. The amplitude channel of modeled holographic image data 412 is then compared to target holographic image data 111 at operation 402 using any suitable error model or function such as a peak signal to noise ratio error function, a minimum absolute error function, or a root mean square error function and the resultant error measurement is compared to a predetermined error threshold, TH. In some embodiments, modeled holographic image data 412 based on intermediate diffraction pattern image data 113 and forward propagation model 401 may not meet error threshold, TH, and convergence is only provided using iterative propagation techniques. That is, DNN module 102 may not generate diffraction pattern image data that passes a suitable error threshold, TH, which indicates acceptable objective image quality.

At a particular iteration, when the error generated by comparing the amplitude channel of modeled holographic image data 412 to the single channel of target holographic image data 111 compares favorably to the error threshold, processing ends as shown at operation 403 and diffraction pattern image data 411 for the iteration are provided as final diffraction pattern image data 114 or the phase channel for diffraction pattern image data 411 are provided as final diffraction pattern image data 114 (i.e., since the amplitude channel may all be the same normalized value in some embodiments). When the generated error compares unfavorably to the error threshold, processing continues at operation 404, where target domain constraints are applied to enforce the target image amplitude (or progress towards it) while maintaining phase information. In an embodiment, the amplitude of target holographic image data 111 may be merged with the phase of modeled holographic image data 412.

As shown, inverse propagation model 405 is then applied. Subsequently, at operation 406, SLM domain constraints are applied to enforce SLM requirements. In an embodiment, the resultant amplitudes are normalized (e.g., for phase only SLM). In an embodiment, the phase plane from the modeled diffraction pattern image is used as part of diffraction pattern image data 411 while the amplitude channel is set to the normalized value (e.g., one) for each pixel and processing continues as discussed until convergence is met. Notably, diffraction pattern image data 411 may not have modulated amplitude values when SLM 104 is unable to modulate amplitude. Through normalization and iteration, convergence is reached with diffraction pattern image data 411 having constant normalized amplitude.

Returning to FIG. 1, as discussed, final diffraction pattern image data 114 is provided to SLM 104 for display and presentation of a corresponding hologram to a user. Although discussed herein with respect to constant normalized amplitude and modulated phase for the sake of clarity of presentation, the discussed techniques may be applied in examples of constant phase and modulated amplitude by varying amplitude in place of phase and normalizing phase in the preceding discussion. Furthermore, the DNN employed by DNN module 102 may be pre-trained in such contexts to generate intermediate diffraction pattern image data 113 having constant phase values and varying or modulated amplitude values.

Discussion now turns to pre-training of the DNN employed by DNN module 102. For example, FIGS. 1 and 2 illustrate an example implementation phase where a pre-trained DNN is employed in system 100 and/or holographic imaging arrangement 200. The pre-trained DNN may be characterized by DNN architecture details implemented in software or hardware or a combination thereof. In some embodiments, the pre-trained DNN as employed by DNN module 102 may be implemented via a specialized application specific integrated circuit (ASIC) for the purposes of acceleration. Such DNN architecture details include, for example, number of layers, filters or convolutional kernels applied by each layer, filter values, parameters for ReLu operations, max pooling operations, LRN operations, and so on. Some of such DNN architecture details may be preselected (e.g., layers, numbers of kernels, and other architectural details) while other DNN architecture details (e.g., weights, filter values, etc.) are determined during a training phase.

Figure 5:
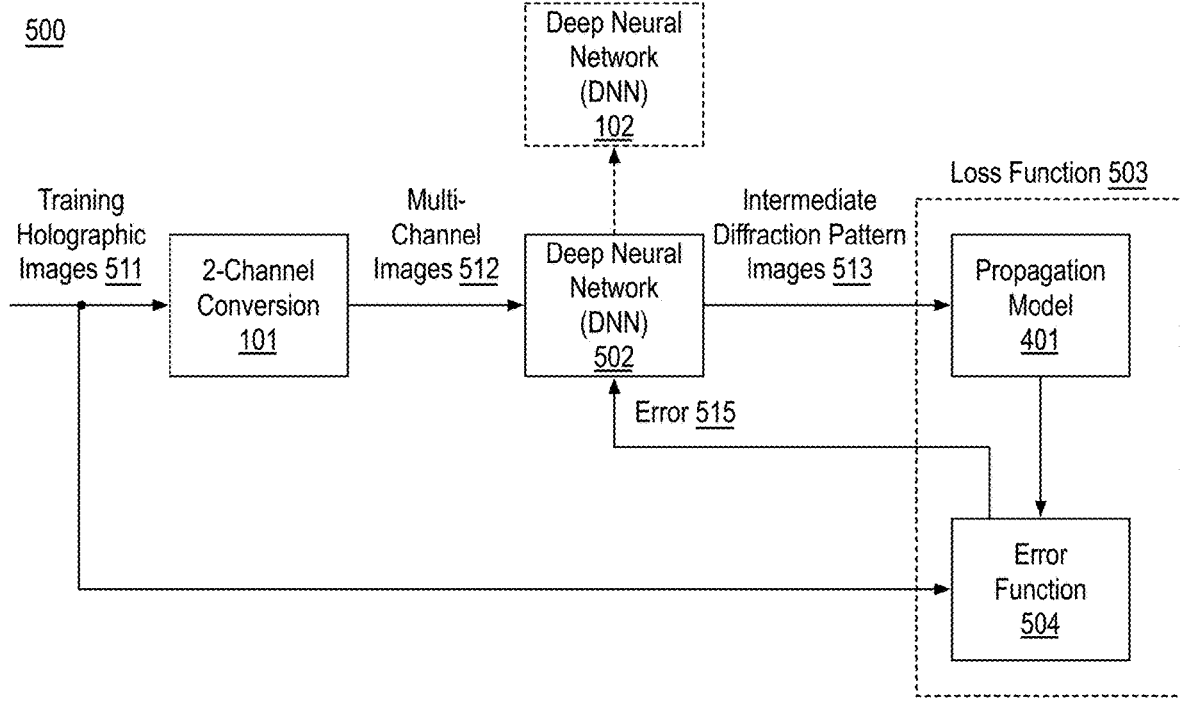
FIG. 5 illustrates exemplary training of an example DNN.

FIG. 5 illustrates exemplary training of an example DNN 502, arranged in accordance with at least some implementations of the present disclosure. As shown in FIG. 5, system 500 includes 2-channel conversion module 101, a deep neural network (DNN) 502, and a loss function module 503 that includes propagation model 401 and an error function module 504. As shown, system 500 generates DNN 502 for implementation by DNN module 102. For example, the DNN parameters corresponding to implementation by DNN module 102 may be stored to memory or transmitted to another device for implementation.

As shown, system 500 receives a training set of target holographic image data 511, which may have any characteristics discussed herein with respect to target holographic image data 111. Furthermore, target holographic image data 511 may include data corresponding to any number of training images such as hundreds, thousands, or more. In some embodiments, the training images may be selected based on the expected target holographic image data 111 to be employed during the implementation phase. For example, the more target holographic image data 511 is representative of target holographic image data 111, the better training may be attained. In some embodiments, wherein DNN 502 is trained using specialized training holographic image data 511 corresponding to a predetermined application of holographic imaging arrangement 200. Such specific content may include specific content for automotive HUDs (e.g., arrows, text, symbols, traffic signs, etc.) or any other application (e.g., gaming content, etc.) and/or specific content for a particular holographic imaging arrangement 200 including near range hologram distance (e.g., less than 1 m), mid-range hologram distance (e.g., 1 to 3 m), or far range hologram distance (e.g., greater than 3 m).

Target holographic image data 511 is received by 2-channel conversion module 101, which converts each instance of image data of target holographic image data 511 to multi-channel image data 512 using techniques discussed herein with respect to FIG. 1. As shown, target holographic image data 511 are provided to DNN 502 in a manner conducive to training DNN 502. For example, each or several instances of image data (e.g., a single image or a batch of any number of images) may be provided to generate intermediate diffraction pattern image data 513, an error 515 may be determined, the error may be back-propagated through the DNN employed by DNN 502 to update the weights thereof and such processing may be repeated until the DNN employed by DNN 502 attains a particular error rate, a particular number of training iterations has been performed, the changes of the weights of the DNN between iterations are below a threshold (e.g., a steady state has been reached), etc.

For example, the resultant intermediate diffraction pattern image data 513 during a particular phase of training are provided to propagation model 401, which generates corresponding modeled holographic image 412 and, via comparison with corresponding target holographic image data 511 using error function module 504, generates error that may be back-propagated through the DNN employed by DNN 502. As discussed, propagation model 401 may employ a selected propagation model (e.g., a Fraunhofer diffraction integral, Fresnel diffraction integral, etc.) that is also tailored to model a particular holographic imaging arrangement 200. For example, loss function module 503 determines a modeled holographic image data (e.g., an observed image) using a forward propagation model and compares the modeled holographic image data with its corresponding target holographic image data 511 using a selected error function (e.g., RMS, MAE, or PSNR) as applied by error function module 504.

Furthermore, a different DNN may be trained based on any combination of the underlying propagation model selected for implementation by iterative process module 103, particular holographic imaging arrangement 200, and the application (e.g., expected image content). That is, the pre-trained DNN may be tailored or customized to any or all of holographic imaging arrangement 200, the underlying propagation model to be employed, and expected image content during employment. Any number of such DNNs may be trained and deployed during implementation phase as discussed herein.

Figure 6:
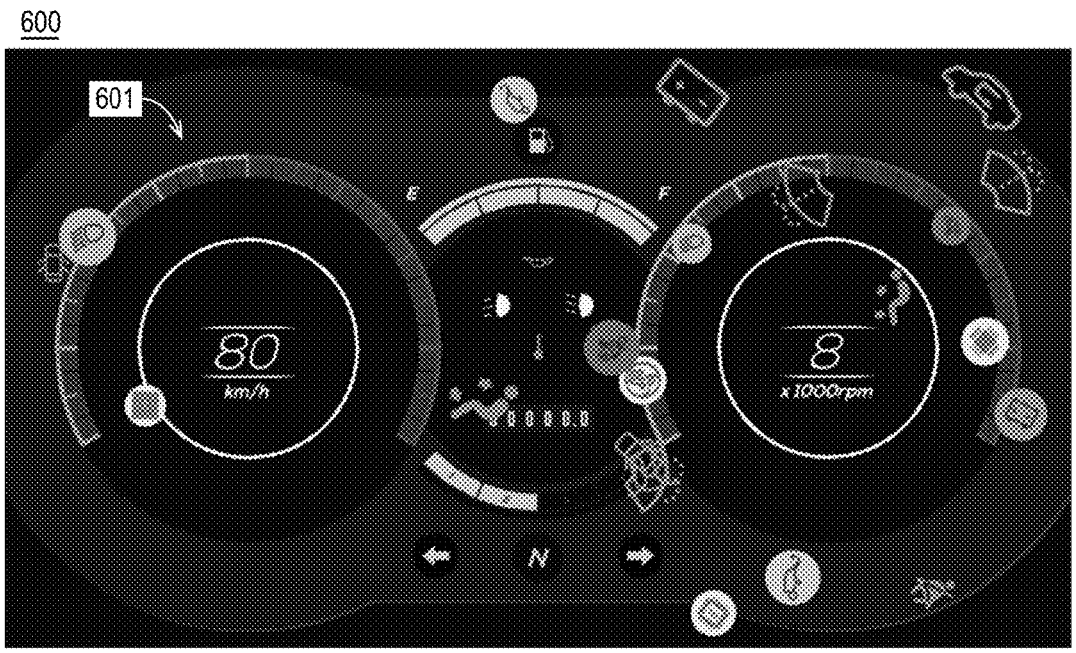
FIG. 6 illustrates an example target holographic image.

FIG. 6 illustrates an example target holographic image 600, arranged in accordance with at least some implementations of the present disclosure. For example, target holographic image 600 may correspond to any target holographic image data 111, 511 discussed herein. In the context of FIG. 6, target holographic image 600 is a composite image of automotive HUD elements 601 such as images of text, dials, automotive signals and symbols, linear portions, etc. Although illustrated with respect to a composite image of automotive HUD elements 601, the techniques discussed herein may be applied to any suitable target holographic image data 111, 511 corresponding to any target holographic imagery.

Figure 7:
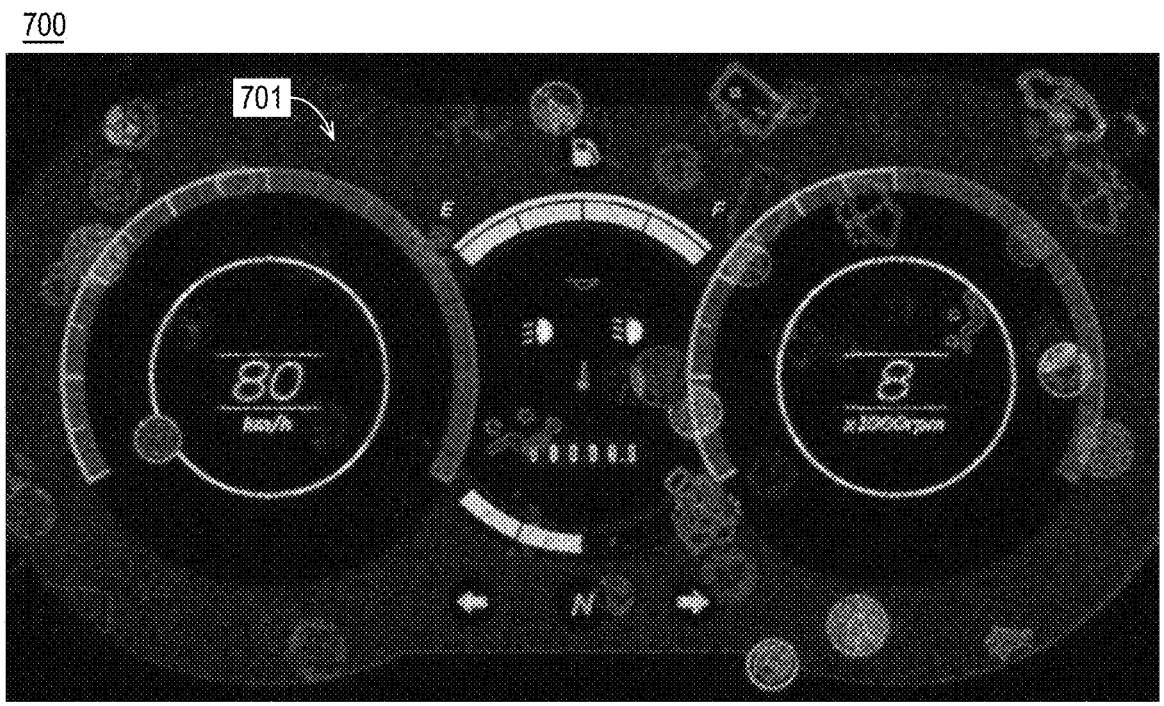
FIG. 7 illustrates an example holographic image corresponding to exemplary intermediate diffraction pattern image data.

FIG. 7 illustrates an example holographic image 700 corresponding to exemplary intermediate diffraction pattern image data, arranged in accordance with at least some implementations of the present disclosure. For example, holographic image 700 may correspond to modeled holographic image data generated based on exemplary intermediate diffraction pattern image data using a selected forward propagation model as disused herein. For example, holographic image 700 may present an amplitude channel corresponding to modeled holographic image data 412 after forward propagation is performed on intermediate diffraction pattern image data 113 (and before iterative processing). As shown in FIG. 7, holographic image 700 has a correspondence to target holographic image 600 but automotive HUD elements 701 have evident visual artifacts. Notably, holographic image 700 may not pass an objective image error comparison relative to target holographic image 600 but intermediate diffraction pattern image data 113 corresponding to holographic image 700 may provide a starting point for iterative propagation processing as discussed herein.

Figure 8:
FIG. 8 illustrates an example diffraction pattern image corresponding to exemplary diffraction pattern image data.

FIG. 8 illustrates an example diffraction pattern image 800 corresponding to exemplary diffraction pattern image data, arranged in accordance with at least some implementations of the present disclosure. For example, diffraction pattern image 800 may provide a phase channel corresponding to one of intermediate diffraction pattern image data 113 or final diffraction pattern image data 114. As shown, little or no visual correspondence may be made between diffraction pattern image 800 and target holographic image 600. As discussed, diffraction pattern image data corresponding to diffraction pattern image 800 may be generated using a hybrid approaching implementing a DNN inference followed by propagation model iterative convergence.

Figure 9A:
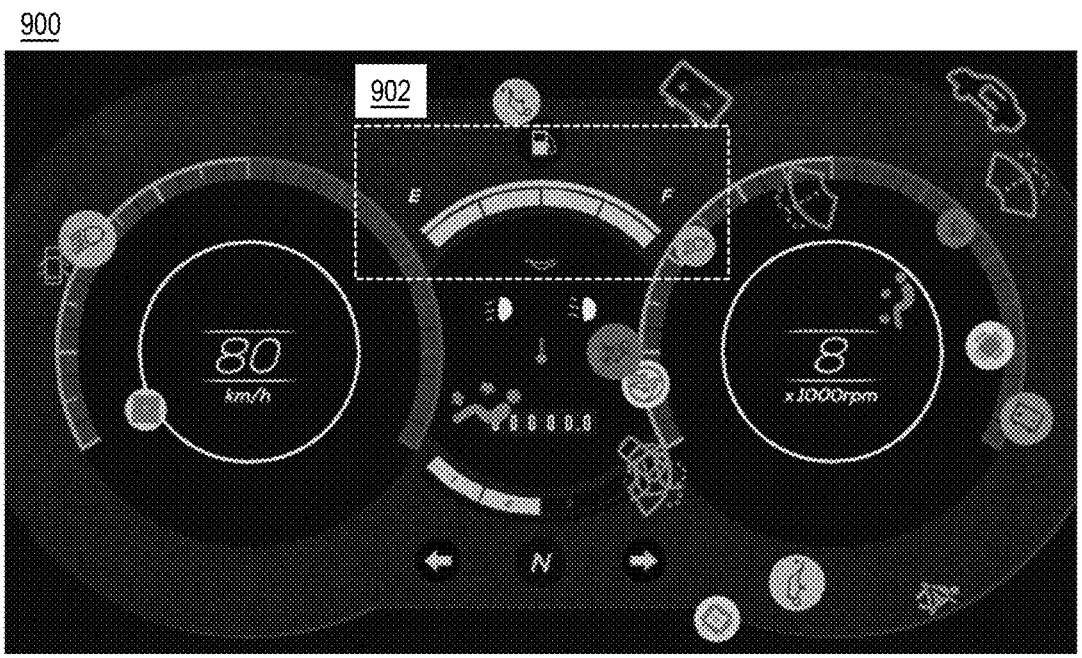
FIG. 9A illustrates an example resultant holographic image corresponding to exemplary final diffraction pattern image data.
Figure 9B:
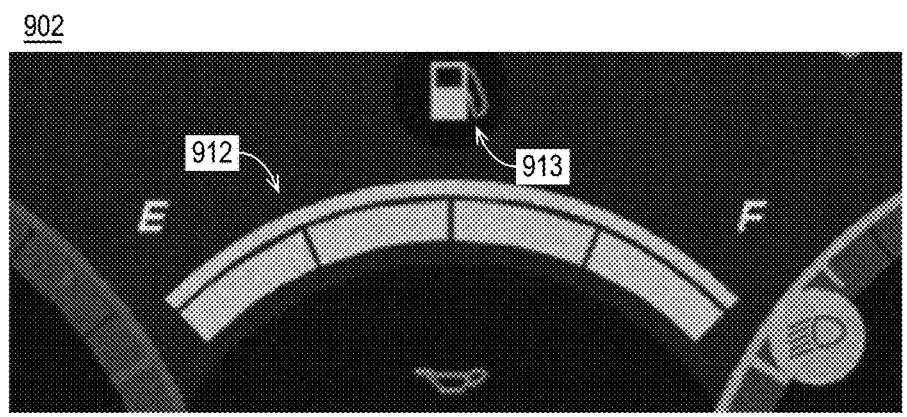
FIG. 9B illustrates a detailed presentation of a portion of the resultant holographic image of FIG. 9A.
Figure 9C:
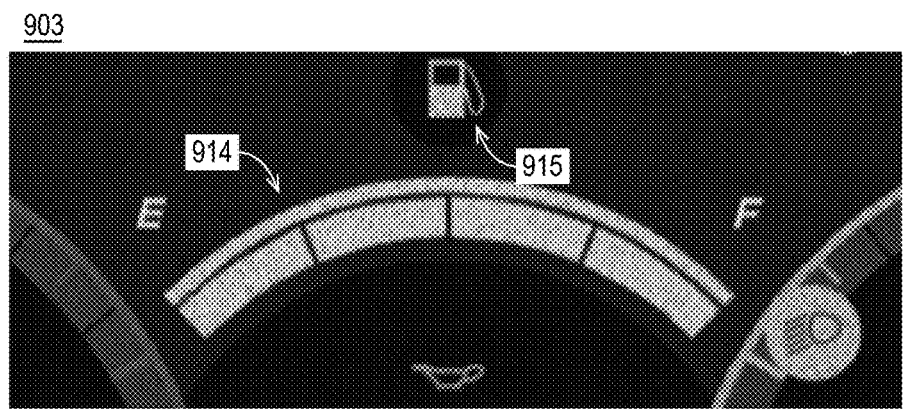
FIG. 9C illustrates an example detailed presentation of an analogous portion to that of FIG. 9B corresponding to final diffraction pattern image data generated using only iterative process convergence.

FIG. 9A illustrates an example resultant holographic image 900 corresponding to exemplary final diffraction pattern image data 114, FIG. 9B illustrates a detailed presentation of a portion 902 of holographic image 900, and FIG. 9C illustrates an example detailed presentation of an analogous portion 903 corresponding to final diffraction pattern image data generated using only propagation model iterative convergence, arranged in accordance with at least some implementations of the present disclosure. As shown in FIG. 9A, resultant holographic image 900 has a close visual correspondence to target holographic image 600. Furthermore, as shown with respect to FIGS. 9B and 9C, resultant holographic image 900 has improved subjective quality even at approximately the same error. As shown in portion 902, automotive element 912 is sharp and has very little speckle (the same is seen in automotive element 913). In contrast, portion 903 (as generated without DNN processing) has an automotive element 914 with evident undesirable speckle and less sharpness (again, the same effects are evident in automotive element 915). For example, although resultant holographic image 900 and its counterpart generated with only propagation model iterative convergence (only portion 903 of which is shown) may have the same RMSE, resultant holographic image 900 as generated using DNN and propagation model iterative convergence has better subjective image quality in terms of being less grainy, having less speckle, and being sharper. The discussed techniques therefore provide faster convergence, less processing, and improved subjective image performance.

Figure 10:
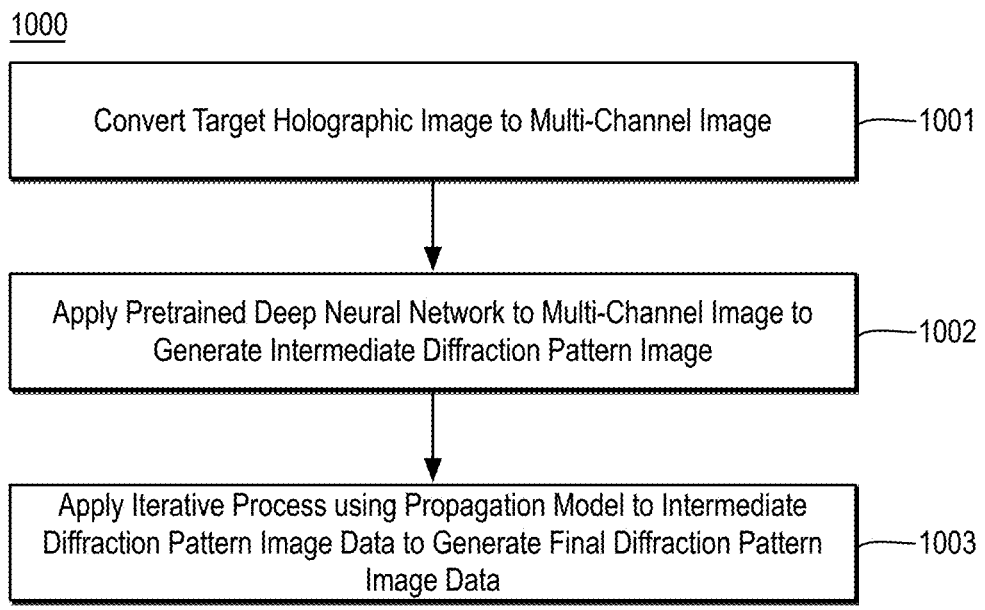
FIG. 10 is a flow diagram illustrating an example process for generating holographic images.

FIG. 10 is a flow diagram illustrating an example process 1000 for generating holographic images, arranged in accordance with at least some implementations of the present disclosure. Process 1000 may include one or more operations 1001-1003 as illustrated in FIG. 10. Process 1000 may form at least part of a holographic imaging process. By way of non-limiting example, process 1000 may form at least part of a holographic imaging process performed by system 100 as discussed herein. Furthermore, process 1000 will be described herein with reference to system 1100 of FIG. 11.

Figure 11:
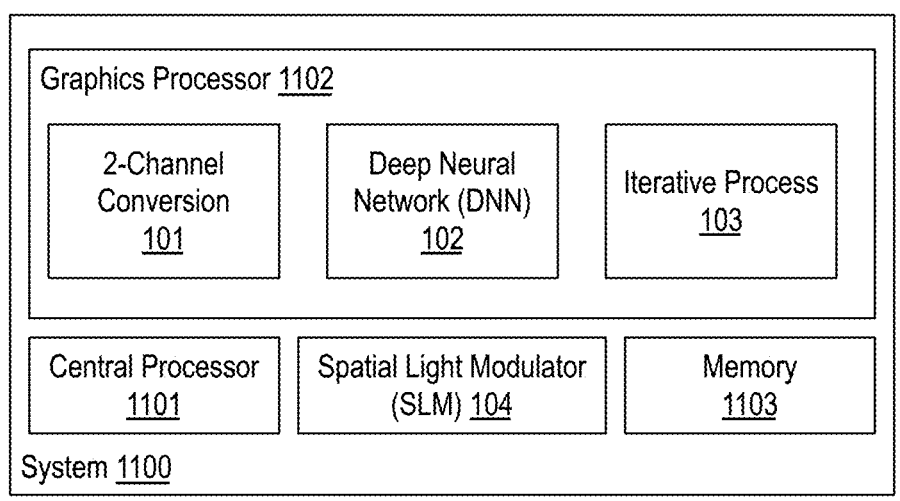
FIG. 11 is an illustrative diagram of an example system for generating holographic images.

FIG. 11 is an illustrative diagram of an example system 1100 for generating holographic images, arranged in accordance with at least some implementations of the present disclosure. As shown in FIG. 11, system 1100 includes one or more central processing units 1101 (i.e., central processor(s)), a graphics processing unit 1102 (i.e., graphics processor), memory stores 1103, and SLM 104 or another holographic imaging device. Also as shown, graphics processing unit 1102 may include or implement 2-channel conversion module 101, deep neural network (DNN) module 102, and iterative process module 103. Such modules may be implemented to perform operations as discussed herein. In the example of system 1100, memory stores 1103 may store target holographic image data, multi-channel image data, intermediate diffraction pattern image data, final diffraction pattern image data, DNN parameters, propagation model parameters, or any other data or data structure discussed herein.

As shown, in some examples, intermediate diffraction pattern image data are implemented via graphics processing unit 1102. In other examples, one or more or portions of 2-channel conversion module 101, DNN module 102, and iterative process module 103 are implemented via central processing units 1101 or an image processing unit (not shown) of system 1100. In yet other examples, one or more or portions of 2-channel conversion module 101, DNN module 102, and iterative process module 103 are implemented via an imaging processing pipeline, graphics pipeline, or the like.

Graphics processing unit 1102 may include any number and type of graphics processing units that may provide the operations as discussed herein. Such operations may be implemented via software, hardware, or a combination thereof. For example, graphics processing unit 1102 may include circuitry dedicated to manipulate holographic image data, DNN data, etc. obtained from memory stores 1103. Central processing units 1101 may include any number and type of processing units or modules that may provide control and other high level functions for system 1100 and/or provide any operations as discussed herein. Memory stores 1103 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 1103 may be implemented by cache memory. In an embodiment, one or more or portions of 2-channel conversion module 101, DNN module 102, and iterative process module 103 are implemented via an execution unit (EU) of graphics processing unit 1102. The EU may include, for example, programmable logic or circuitry such as a logic core or cores that may provide a wide array of programmable logic functions. In an embodiment, one or more or portions of 2-channel conversion module 101, DNN module 102, and iterative process module 103 are implemented via dedicated hardware such as fixed function circuitry or the like. Fixed function circuitry may include dedicated logic or circuitry and may provide a set of fixed function entry points that may map to the dedicated logic for a fixed purpose or function. In some embodiments, one or more or portions of 2-channel conversion module 101, DNN module 102, and iterative process module 103 are implemented via an application specific integrated circuit (ASIC). The ASIC may include an integrated circuitry customized to perform the operations discussed herein.

Returning to discussion of FIG. 10, process 1000 begins at operation 1001, where target holographic image data are converted to multi-channel image data having an amplitude component channel and a phase component channel. The target holographic image data may correspond to any target holographic image such that the image is to be viewed by a user and the target holographic image data has a data structure corresponding to the target holographic image. The target holographic image data may be converted to multi-channel image data using any suitable technique or techniques. In an embodiment, the multi-channel image data includes a complex number representation having a real value representative of the amplitude component channel and an imaginary value representative of the phase component channel In an embodiment, converting the target holographic image data includes setting each amplitude value of the amplitude component channel to a corresponding value of the target holographic image data and applying a phase pattern to generate phase values of the phase component channel In an embodiment, applying the phase pattern includes randomly generating the phase values. In an embodiment, applying the phase pattern includes generating phase values to provide one or more regions of uniform amplitude based on the propagation model.

Processing continues at operation 1002, where a pre-trained deep neural network is applied to the multi-channel image data to generate intermediate diffraction pattern image data corresponding to the target holographic image data. The rained deep neural network may be applied to the multi-channel image data using any suitable technique or techniques. In an embodiment, the pre-trained deep neural network is trained using a loss function including the iterative application of forward and inverse propagation model at operation 1003 as discussed below and an error function corresponding to the error threshold applied at operation 1003 as discussed below and without use of ground truth diffraction pattern image data. In an embodiment, the error function is a peak signal to noise ratio error function. In an embodiment, the error function is a minimum absolute error function. In an embodiment, the error function is a root mean square error function. In an embodiment, the pre-trained deep neural network is trained using specialized training holographic image data corresponding to a predetermined application of the holographic imaging arrangement. The deep neural network may be any suitable artificial neural network having multiple layers between the input and output thereof with weights trained based on automatic training. In an embodiment, the deep neural network is an encoder-decoder convolutional neural network having multiple convolutional layers each configured to apply one or more convolutional kernels.

Processing continues at operation 1003, where an iterative process using a propagation model is applied to the intermediate diffraction pattern image data to generate final diffraction pattern image data. For example, operation 1003 may be characterized as an iterative diffraction pattern computation process or algorithm. For example, at operation forward and inverse propagation models may be iteratively applied to the intermediate diffraction pattern image data to generate final diffraction pattern image data. The aforementioned iterative process applied to the intermediate diffraction pattern image data may use any suitable technique or techniques. In an embodiment, the propagation model corresponds to a holographic imaging arrangement to generate a holographic image using diffraction pattern image data. For example, the propagation model may be selected and parameterized based on a particular holographic imaging arrangement that is configured to generate a holographic image using diffraction pattern image data. In an embodiment, final modeled holographic image data generated based on the iterative process or algorithm and the final diffraction pattern image data meets an error threshold with respect to the target holographic image data. Furthermore, in some embodiments, intermediate modeled holographic image data generated based on the selected propagation model and the intermediate diffraction pattern image data does not meet the error threshold with respect to the target holographic image. That is, the intermediate diffraction pattern image data may not meet the error threshold while the final diffraction pattern image data does meet the error threshold.

The holographic imaging arrangement may include any combination of light source(s), optic(s), and holographic imaging device(s) such as SLM(s). In an embodiment, each pixel of the intermediate and final diffraction pattern image data includes a normalized amplitude and the holographic imaging arrangement includes a spatial light phase modulator capable of modulating phase and incapable of modulating amplitude. In other embodiments, each pixel of the intermediate and final diffraction pattern image data includes a normalized phase and the holographic imaging arrangement includes a spatial light phase modulator capable of modulating amplitude and incapable of modulating phase. Furthermore, applying the propagation model may include application of any suitable propagation model such as applying a fast Fourier transform that models the holographic imaging arrangement or applying a quadratic phase profile and a fast Fourier transform that model the holographic imaging arrangement.

The final diffraction pattern image data may be stored, transmitted at another device, or used locally to present a corresponding final diffraction pattern image via a holographic display for the ultimate presentment of a holographic image or hologram to a user. In an embodiment, process 1000 further includes presenting a final diffraction pattern image corresponding to the final diffraction pattern image data via a holographic imaging device and projecting spatially coherent light onto the holographic imaging device to generate a final holographic image for a user.

Process 1000 may provide for generating diffraction pattern image data for any number of target holographic images and corresponding target holographic image data. Process 1000 may be repeated any number of times either in series or in parallel for any number of input holographic images, input holographic images of a video sequence of holographic images, etc.

Various components of the systems described herein may be implemented in software, firmware, and/or hardware and/or any combination thereof. For example, various components of devices or systems discussed herein may be provided, at least in part, by hardware of a computing System-on-a-Chip (SoC) such as may be found in a computing system such as, for example, a computer, a laptop computer, a tablet, or a smart phone. For example, such components or modules may be implemented via a multi-core SoC processor. Those skilled in the art may recognize that systems described herein may include additional components that have not been depicted in the corresponding figures.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the discussed operations, modules, or components discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 12:
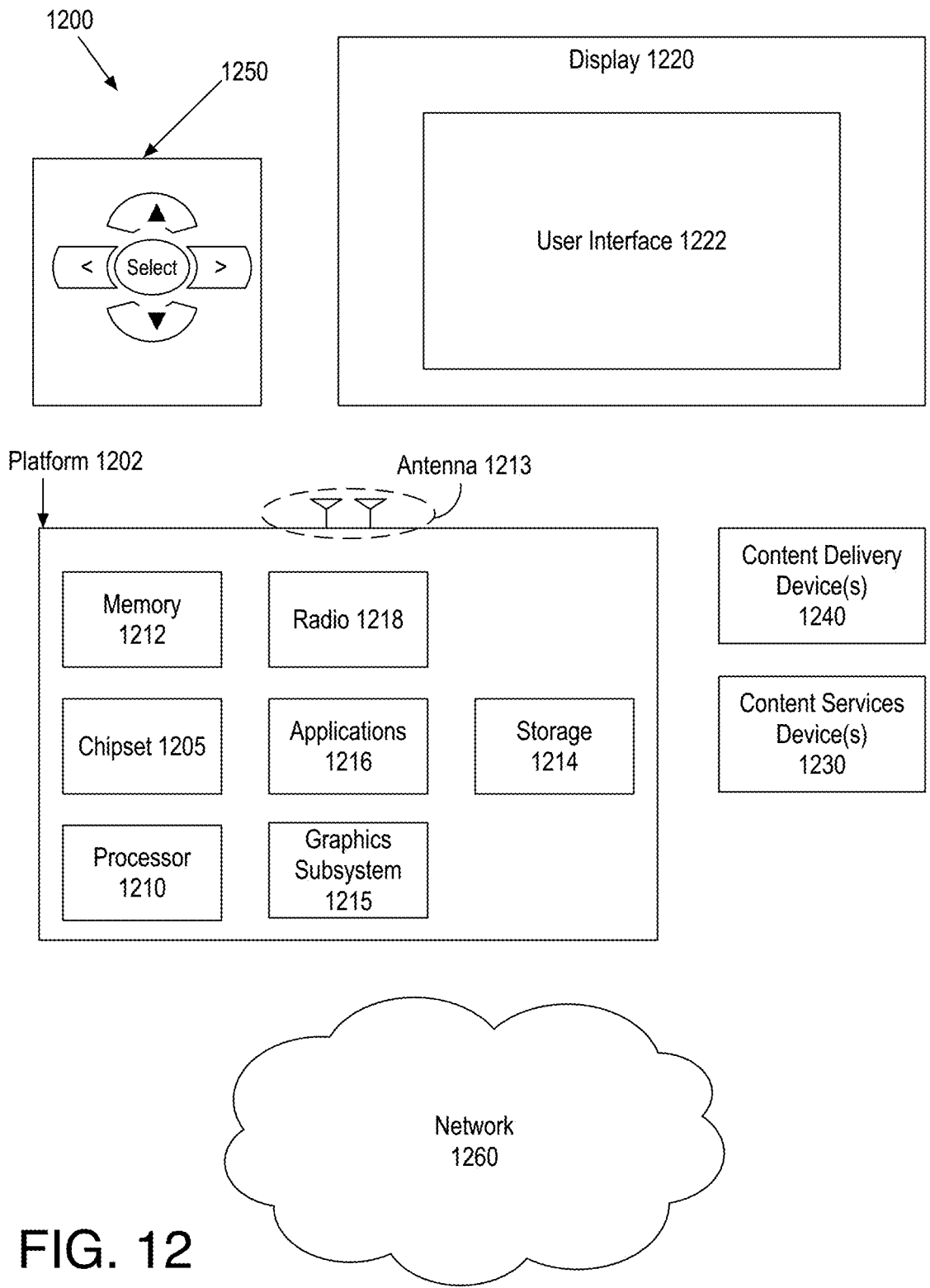
FIG. 12 is an illustrative diagram of an example system.

FIG. 12 is an illustrative diagram of an example system 1200, arranged in accordance with at least some implementations of the present disclosure. In various implementations, system 1200 may be a computing system although system 1200 is not limited to this context. For example, system 1200 may be incorporated into a personal computer (PC), laptop computer, ultra-laptop computer, tablet, phablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, peripheral device, gaming console, wearable device, display device, all-in-one device, two-in-one device, and so forth.

In various implementations, system 1200 includes a platform 1202 coupled to a display 1220. Platform 1202 may receive content from a content device such as content services device(s) 1230 or content delivery device(s) 1240 or other similar content sources such as a camera or camera module or the like. A navigation controller 1250 including one or more navigation features may be used to interact with, for example, platform 1202 and/or display 1220. Each of these components is described in greater detail below.

In various implementations, platform 1202 may include any combination of a chipset 1205, processor 1210, memory 1212, antenna 1213, storage 1214, graphics subsystem 1215, applications 1216 and/or radio 1218. Chipset 1205 may provide intercommunication among processor 1210, memory 1212, storage 1214, graphics subsystem 1215, applications 1216 and/or radio 1218. For example, chipset 1205 may include a storage adapter (not depicted) capable of providing intercommunication with storage 1214.

Processor 1210 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1210 may be dual-core processor(s), dual-core mobile processor(s), and so forth.

Memory 1212 may be implemented as a volatile memory device such as, but not limited to, a Random Access Memory (RAM), Dynamic Random Access Memory (DRAM), or Static RAM (SRAM).

Storage 1214 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1214 may include technology to increase the storage performance enhanced protection for valuable digital media when multiple hard drives are included, for example.

Graphics subsystem 1215 may perform processing of images such as still images, graphics, or video for display. Graphics subsystem 1215 may be a graphics processing unit (GPU), a visual processing unit (VPU), or an image processing unit, for example. In some examples, graphics subsystem 1215 may perform scanned image rendering as discussed herein. An analog or digital interface may be used to communicatively couple graphics subsystem 1215 and display 1220. For example, the interface may be any of a High-Definition Multimedia Interface, DisplayPort, wireless HDMI, and/or wireless HD compliant techniques. Graphics subsystem 1215 may be integrated into processor 1210 or chipset 1205. In some implementations, graphics subsystem 1215 may be a stand-alone device communicatively coupled to chipset 1205.

The image processing techniques described herein may be implemented in various hardware architectures. For example, image processing functionality may be integrated within a chipset. Alternatively, a discrete graphics and/or image processor and/or application specific integrated circuit may be used. As still another implementation, the image processing may be provided by a general purpose processor, including a multi-core processor. In further embodiments, the functions may be implemented in a consumer electronics device.

Radio 1218 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1218 may operate in accordance with one or more applicable standards in any version.

In various implementations, display 1220 may include any flat panel monitor or display. Display 1220 may include, for example, a computer display screen, touch screen display, video monitor, television-like device, and/or a television. Display 1220 may be digital and/or analog. In various implementations, display 1220 may be a holographic display. Also, display 1220 may be a transparent surface that may receive a visual projection. Such projections may convey various forms of information, images, and/or objects. For example, such projections may be a visual overlay for a mobile augmented reality (MAR) application. Under the control of one or more software applications 1216, platform 1202 may display user interface 1222 on display 1220.

In various implementations, content services device(s) 1230 may be hosted by any national, international and/or independent service and thus accessible to platform 1202 via the Internet, for example. Content services device(s) 1230 may be coupled to platform 1202 and/or to display 1220. Platform 1202 and/or content services device(s) 1230 may be coupled to a network 1260 to communicate (e.g., send and/or receive) media information to and from network 1260. Content delivery device(s) 1240 also may be coupled to platform 1202 and/or to display 1220.

In various implementations, content services device(s) 1230 may include a cable television box, personal computer, network, telephone, Internet enabled devices or appliance capable of delivering digital information and/or content, and any other similar device capable of uni-directionally or bi-directionally communicating content between content providers and platform 1202 and/display 1220, via network 1260 or directly. It will be appreciated that the content may be communicated uni-directionally and/or bi-directionally to and from any one of the components in system 1200 and a content provider via network 1260. Examples of content may include any media information including, for example, video, music, medical and gaming information, and so forth.

Content services device(s) 1230 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1202 may receive control signals from navigation controller 1250 having one or more navigation features. The navigation features of navigation controller 1250 may be used to interact with user interface 1222, for example. In various embodiments, navigation controller 1250 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1250 may be replicated on a display (e.g., display 1220) by movements of a pointer, cursor, focus ring, or other visual indicators displayed on the display. For example, under the control of software applications 1216, the navigation features located on navigation controller 1250 may be mapped to virtual navigation features displayed on user interface 1222, for example. In various embodiments, navigation controller 1250 may not be a separate component but may be integrated into platform 1202 and/or display 1220. The present disclosure, however, is not limited to the elements or in the context shown or described herein.

In various implementations, drivers (not shown) may include technology to enable users to instantly turn on and off platform 1202 like a television with the touch of a button after initial boot-up, when enabled, for example. Program logic may allow platform 1202 to stream content to media adaptors or other content services device(s) 1230 or content delivery device(s) 1240 even when the platform is turned "off." In addition, chipset 1205 may include hardware and/or software support for 5.1 surround sound audio and/or high definition 12.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 1200 may be integrated. For example, platform 1202 and content services device(s) 1230 may be integrated, or platform 1202 and content delivery device(s) 1240 may be integrated, or platform 1202, content services device(s) 1230, and content delivery device(s) 1240 may be integrated, for example. In various embodiments, platform 1202 and display 1220 may be an integrated unit. Display 1220 and content service device(s) 1230 may be integrated, or display 1220 and content delivery device(s)

1240 may be integrated, for example. These examples are not meant to limit the present disclosure.

In various embodiments, system 1200 may be implemented as a wireless system, a wired system, or a combination of both. When implemented as a wireless system, system 1200 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1200 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1202 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 12.

Figure 13:
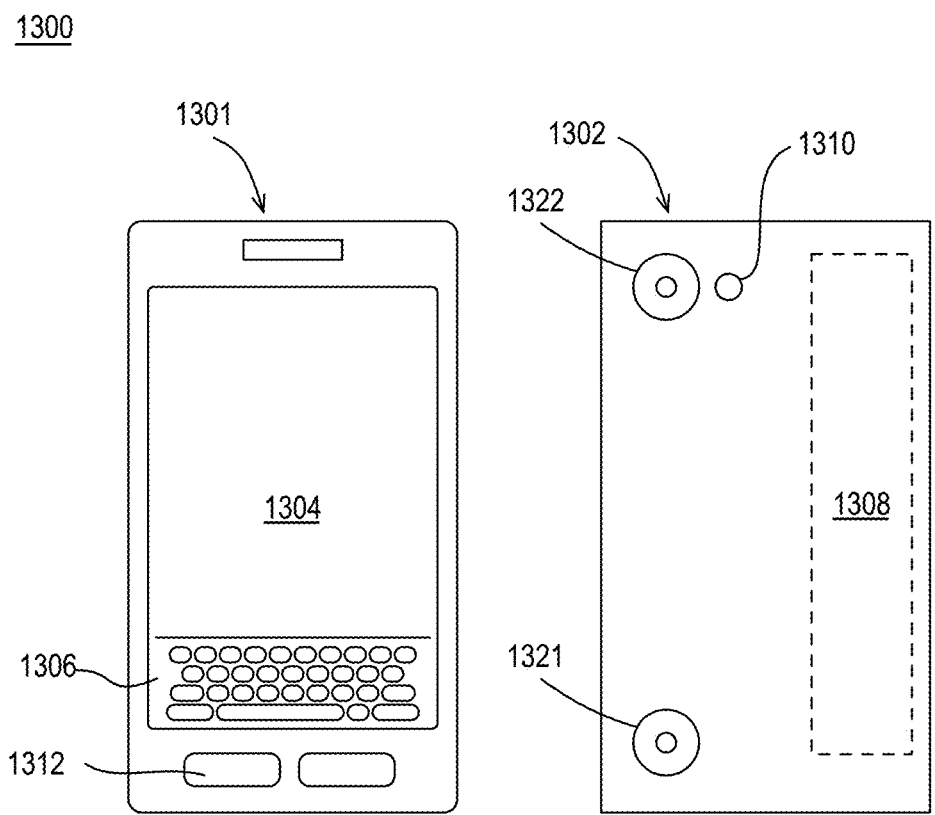
FIG. 13 illustrates an example device, all arranged in accordance with at least some implementations of the present disclosure.

As described above, system 1200 may be embodied in varying physical styles or form factors. FIG. 13 illustrates an example small form factor device 1300, arranged in accordance with at least some implementations of the present disclosure. In some examples, system 1200 may be implemented via device 1300. In other examples, other systems, components, or modules discussed herein or portions thereof may be implemented via device 1300. In various embodiments, for example, device 1300 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smartphone, smart tablet or smart mobile television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be implemented by a motor vehicle or robot, or worn by a person, such as wrist computers, finger computers, ring computers, eyeglass computers, belt-clip computers, arm-band computers, shoe computers, clothing computers, and other wearable computers. In various embodiments, for example, a mobile computing device may be implemented as a smartphone capable of executing computer applications, as well as voice communications and/or data communications. Although some embodiments may be described with a mobile computing device implemented as a smartphone by way of example, it may be appreciated that other embodiments may be implemented using other wireless mobile computing devices as well. The embodiments are not limited in this context.

As shown in FIG. 13, device 1300 may include a housing with a front 1301 and a back 1302. Device 1300 includes a display 1304, an input/output (I/O) device 1306, a color camera 1321, a color camera 1322, and an integrated antenna 1308. For example, color camera 1321 and color camera 1322 and may input image data (e.g., left and right images) as discussed herein. Device 1300 also may include navigation features 1312. I/O device 1306 may include any suitable I/O device for entering information into a mobile computing device. Examples for I/O device 1306 may include an alphanumeric keyboard, a numeric keypad, a touch pad, input keys, buttons, switches, microphones, speakers, voice recognition device and software, and so forth. Information also may be entered into device 1300 by way of microphone (not shown), or may be digitized by a voice recognition device. As shown, device 1300 may include color cameras 1321, 1322, and a flash 1310 integrated into back 1302 (or elsewhere) of device 1300. In other examples, color cameras 1321, 1322, and flash 1310 may be integrated into front 1301 of device 1300 or both front and back sets of cameras may be provided. Color cameras 1321, 1322 and a flash 1310 may be components of a camera module to originate color image data that may be processed into an image or streaming video that is output to display 1304 and/or communicated remotely from device 1300 via antenna 1308 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a method for generating holographic images comprises converting target holographic image data to multi-channel image data having an amplitude component channel and a phase component channel, applying a pre-trained deep neural network to the multi-channel image data to generate intermediate diffraction pattern image data corresponding to the target holographic image data, and applying an iterative process using a propagation model to the intermediate diffraction pattern image data to generate final diffraction pattern image data, wherein the propagation model corresponds to a holographic imaging arrangement to generate a holographic image using diffraction pattern image data, and wherein final modeled holographic image data generated by the iterative process using the propagation model and the final diffraction pattern image data meets an error threshold with respect to the target holographic image data and wherein intermediate modeled holographic image data generated based on the propagation model and the intermediate diffraction pattern image data does not meet the error threshold with respect to the target holographic image.

In one or more second embodiments, further to the first embodiments, each pixel of the intermediate and final diffraction pattern image data comprises a normalized amplitude and wherein the holographic imaging arrangement comprises a spatial light phase modulator capable of modulating phase and incapable of modulating amplitude.

In one or more third embodiments, further to the first or second embodiments, the pre-trained deep neural network is trained using a loss function comprising the iterative propagation model and an error function corresponding to the error threshold and without use of ground truth diffraction pattern image data.

In one or more fourth embodiments, further to the first through third embodiments, the error function comprises one of a peak signal to noise ratio error function, a minimum absolute error function, or a root mean square error function.

In one or more fifth embodiments, further to the first through fourth embodiments, the pretrained deep neural network is further trained using specialized training holographic image data corresponding to a predetermined application of the holographic imaging arrangement.

In one or more sixth embodiments, further to the first through fifth embodiments, the multi-channel image data comprise a complex number representation having a real value representative of the amplitude component channel and an imaginary value representative of the phase component channel.

In one or more seventh embodiments, further to the first through sixth embodiments, converting the target holographic image data comprises setting each amplitude value of the amplitude component channel to a corresponding value of the target holographic image data and applying a phase pattern to generate phase values of the phase component channel.

In one or more eighth embodiments, further to the first through seventh embodiments, applying the phase pattern comprises one of randomly generating the phase values or generating phase values to provide one or more regions of uniform amplitude based on the propagation model.

In one or more ninth embodiments, further to the first through eighth embodiments, the pretrained deep neural network comprises an encoder-decoder convolutional neural network having a plurality of convolutional layers each configured to apply one or more convolutional kernels.

In one or more tenth embodiments, further to the first through ninth embodiments, the method further comprises presenting a final diffraction pattern image corresponding to the final diffraction pattern image data via a holographic imaging device and projecting spatially coherent light onto the holographic imaging device to generate a final holographic image for a user.

In one or more eleventh embodiments, further to the first through tenth embodiments, applying the propagation model comprises at least one of applying a fast Fourier transform that models the holographic imaging arrangement or applying a quadratic phase profile and a fast Fourier transform that model the holographic imaging arrangement.

In one or more twelfth embodiments, a device or system includes a memory, a processor, a holographic imaging device, and a light source to perform a method according to any one of the above embodiments.

In one or more thirteenth embodiments, at least one machine readable medium includes a plurality of instructions that in response to being executed on a computing device, cause the computing device to perform a method according to any one of the above embodiments.

In one or more fourteenth embodiments, an apparatus includes means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A system, comprising:
a memory to store target holographic image data and multi-channel image data corresponding to the target holographic image data, the multi-channel image data having an amplitude component channel and a phase component channel; and
a processor coupled to the memory, the processor to:
apply a pre-trained deep neural network to the multi-channel image data to generate intermediate diffraction pattern image data corresponding to the target holographic image data; and
apply an iterative process using a propagation model to the intermediate diffraction pattern image data to generate final diffraction pattern image data, wherein the propagation model corresponds to a holographic imaging arrangement to generate a holographic image using diffraction pattern image data.

2. The system of claim 1, wherein final modeled holographic image data generated by the iterative process using the propagation model and the final diffraction pattern image data meets an error threshold with respect to the target holographic image data.

3. The system of claim 2, wherein intermediate modeled holographic image data generated based on the propagation model and the intermediate diffraction pattern image data does not meet the error threshold with respect to the target holographic image.

4. The system of claim 1, wherein a pixel of the intermediate and final diffraction pattern image data comprises a normalized amplitude and wherein the holographic imaging arrangement comprises a spatial light phase modulator capable of modulating phase and incapable of modulating amplitude.

5. The system of claim 1, wherein the processor is to convert the target holographic image data to the multi-channel image data by the processor to set amplitude values of the amplitude component channel to corresponding values of the target holographic image data and apply a phase pattern to generate phase values of the phase component channel.

6. The system of claim 1, wherein the pre-trained deep neural network comprises an encoder-decoder convolutional neural network having a plurality of convolutional layers each configured to apply one or more convolutional kernels.

7. The system of claim 1, further comprising:
a holographic imaging device to present a final diffraction pattern image corresponding to the final diffraction pattern image data; and
a light source to project spatially coherent light onto the holographic imaging device to generate a final holographic image.

8. The system of claim 1, wherein the processor to apply the propagation model comprises at least one of the processor to apply a fast Fourier transform that models the holographic imaging arrangement or the processor to apply a quadratic phase profile and a fast Fourier transform that model the holographic imaging arrangement.

9. A method, comprising:
receiving target holographic image data and multi-channel image data corresponding to the target holographic image data, the multi-channel image data having an amplitude component channel and a phase component channel;
applying a pre-trained deep neural network to the multi-channel image data to generate intermediate diffraction pattern image data corresponding to the target holographic image data; and
applying an iterative process using a propagation model to the intermediate diffraction pattern image data to generate final diffraction pattern image data, wherein the propagation model corresponds to a holographic imaging arrangement to generate a holographic image using diffraction pattern image data.

10. The method of claim 9, wherein final modeled holographic image data generated by the iterative process using the propagation model and the final diffraction pattern image data meets an error threshold with respect to the target holographic image data.

11. The method of claim 10, wherein intermediate modeled holographic image data generated based on the propagation model and the intermediate diffraction pattern image data does not meet the error threshold with respect to the target holographic image.

12. The method of claim 9, further comprising converting the target holographic image data to the multi-channel image data by setting amplitude values of the amplitude component channel to corresponding values of the target holographic image data and applying a phase pattern to generate phase values of the phase component channel.

13. The method of claim 9, further comprising:
presenting a final diffraction pattern image corresponding to the final diffraction pattern image data via a holographic imaging device; and
projecting spatially coherent light onto the holographic imaging device to generate a final holographic image.

14. The method of claim 9, wherein applying the propagation model comprises at least one of applying a fast Fourier transform that models the holographic imaging arrangement or applying a quadratic phase profile and a fast Fourier transform that model the holographic imaging arrangement.

15. At least one non-transitory machine readable medium comprising a plurality of instructions that, in response to being executed on a computing device, cause the computing device to generate holographic images by:
receiving target holographic image data and multi-channel image data corresponding to the target holographic image data, the multi-channel image data having an amplitude component channel and a phase component channel;
applying a pre-trained deep neural network to the multi-channel image data to generate intermediate diffraction pattern image data corresponding to the target holographic image data; and
applying an iterative process using a propagation model to the intermediate diffraction pattern image data to generate final diffraction pattern image data, wherein the propagation model corresponds to a holographic imaging arrangement to generate a holographic image using diffraction pattern image data.

16. The non-transitory machine readable medium of claim 15, wherein final modeled holographic image data generated by the iterative process using the propagation model and the final diffraction pattern image data meets an error threshold with respect to the target holographic image data.

17. The non-transitory machine readable medium of claim 16, wherein intermediate modeled holographic image data generated based on the propagation model and the intermediate diffraction pattern image data does not meet the error threshold with respect to the target holographic image.

18. The non-transitory machine readable medium of claim 15, further comprising instructions that, in response to being executed on the computing device, cause the computing device to convert the target holographic image data to the multi-channel image data by setting amplitude values of the amplitude component channel to corresponding values of the target holographic image data and applying a phase pattern to generate phase values of the phase component channel.

19. The non-transitory machine readable medium of claim 15, wherein the pre-trained deep neural network comprises an encoder-decoder convolutional neural network having a plurality of convolutional layers each configured to apply one or more convolutional kernels.

20. The non-transitory machine readable medium of claim 15, wherein applying the propagation model comprises at least one of applying a fast Fourier transform that models the holographic imaging arrangement or applying a quadratic phase profile and a fast Fourier transform that model the holographic imaging arrangement.

\* \* \* \* \*